H. C. BOYERS.

Bee Hive.

No. 43,564. Patented July 19, 1864.

Witnesses.

Inventor.

UNITED STATES PATENT OFFICE.

H. C. BOYERS, OF DANVILLE, IOWA.

IMPROVEMENT IN BEE-HIVES.

Specification forming part of Letters Patent No. 43,564, dated July 19, 1864.

*To all whom it may concern:*

Be it known that I, H. C. BOYERS, of Des Moines county, and State of Iowa, have invented a new and useful Improvement in Bee-Hives; and I do hereby declare that the following is a full and exact description thereof, reference being had to the accompanying drawings, and to the letters of reference marked thereon, in which—

Figure 1:
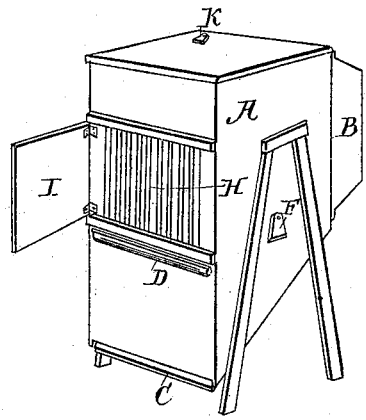
Figure 2:
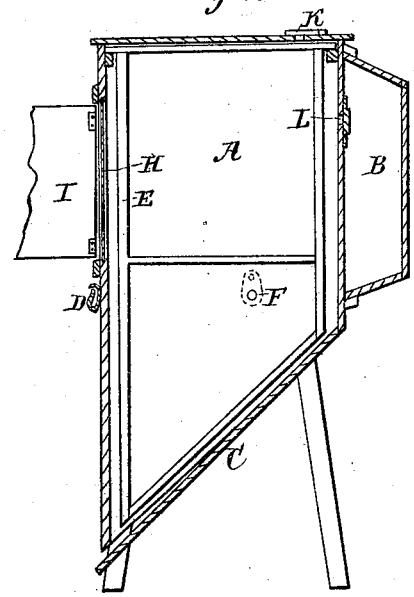
Figure 3:
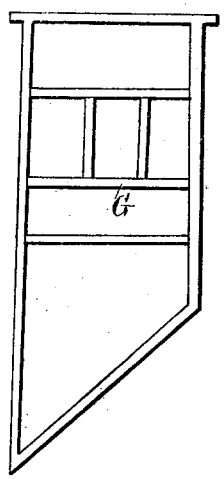
Figure 4:
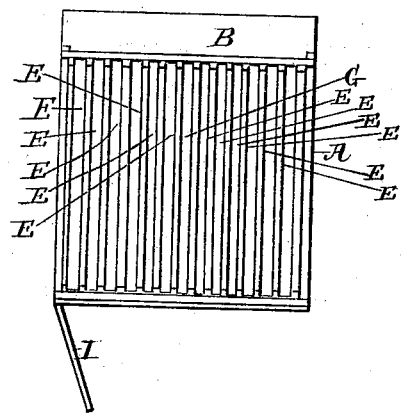

Figure 1 is a perspective view of the hive. Fig. 2 is a vertical longitudinal section of the same. Fig. 3 is a plan of the queen-bee sash. Fig. 4 is a view of the top of the hive with cover removed.

The box A is made with a sloping lower extremity. I attach an addition, B, fastened on with screws or hooks, on the back of my hive, called the "knapsack," which addition is used in the stead of caps or boxes in extending the work of the swarm or to secure "virgin honey."

The hive is suspended in some suitable manner, or may stand on legs, as may be desired. (See Fig. 1.) On the bottom of the hive I attach an adjustable oblique bottom board with a smooth surface. (See Fig. 2, C.) This board is capable of being lowered for the purpose of allowing the bees to pass in and out and for the free circulation of air, or of being raised so as to close up the hive when desired. As a remedy against the moth I attach to my hive a peculiarly-constructed trough, D, in front or on the sides of the hive, in which I lodge liquid poison attractive to the miller. (See Figs. 1 and 2.) This trough is so constructed that the miller can have easy access to the poison, but the bee, being much larger, cannot find access. Thus, to a great extent, the cause which produces the grub is taken away.

On the inside of my hive I suspend a suitable number of double-comb sashes, (see Fig. 4, E,) at proper distances apart, in which the bees insert or build their comb and deposit their honey. These sashes, with their contents, can be easily removed from the hive, singly or in parcels, by driving the bees, by the use of smoke from burning rags or tobacco, injected into the hive at the aperture, Fig. 2, F, on the side of the hive from which it is desired to take the honey or sash. I make my sash double, so that when I choose I can remove from the upper division of the sash the last honey, leaving the bee-bread, &c., below, and return the sash into its place, to be filled again with honey. When I wish to entirely renovate and renew the hive, I remove all the honey-comb from below as well as from above, from about half the sashes, and leaving the rest till the returned sashes are all filled, after which I remove the remainder, and after taking out the honey-comb, bee-bread, &c., return the sashes for refilling, thus rendering the hive more healthy and attractive.

I construct my middle sash, G, different from the rest, with double sash-bars, Fig. 3, making a convenient location for the queen bee in which to erect or build her cell. I never allow this sash to be removed from the hive, except for cleansing or to secure a queen for a new swarm. (See form of sash, Figs. 2 and 3.) In the front side of my hive I make a large opening, which I fill with glass, (see Fig. 1, H,) which I shade with a slide or batten door, I. Removing this shade, I can always ascertain what the bees need and how their work progresses. The top of my hive, which may be fastened with screws or with cleats, may be removed at pleasure by injecting smoke, as before mentioned, into the aperture or top of the hive.

I suspend my hive firmly, so as to allow me to invert another hive on the top of the first when I wish, for I never allow my bees to swarm or remove at a distance from the hive. When there are indications sufficiently strong that a new colony are ready to come out of the old hive, I open the aperture above and invert an empty hive with a corresponding opening on top of the first, and, driving in the bees, close the opening below, and in a short time the new swarm will take its place in the new hive. I then take it down and suspend it as the first, thus avoiding the trouble of hiving and the danger of losing the swarm.

I make an aperture in the back of my hive, (see L, Fig. 2,) so as to afford a passage for the bees into the back addition or knapsack, B, which is never opened, except when I wish to give more room for the swarm or secure virgin honey without interrupting the main hive.

This hive is simple in construction, easily handled, and of portable size, and, withal, easily and cheaply made.

What I claim as my invention, and desire to secure by Letters Patent, is—

The trough D, constructed substantially as described, so as to be accessible to the miller and not to the bee, in combination with the hive, as and for the purposes herein specified.

H. C. BOYERS.

Witnesses:
S. I. SANDERS,
JAMES W. BOYERS.